R. WEBER.
PLOW-STOCK.

No. 186,284. Patented Jan. 16, 1877.

WITNESSES:
E. Wolff
J. H. Scarborough

INVENTOR:
Rob. Weber
BY
Munn
ATTORNEYS.

UNITED STATES PATENT OFFICE

ROBERT WEBER, OF NEW ULM, TEXAS.

IMPROVEMENT IN PLOW-STOCKS.

Specification forming part of Letters Patent No. 186,284, dated January 16, 1877; application filed October 14, 1876.

*To all whom it may concern:*

Figure 1:
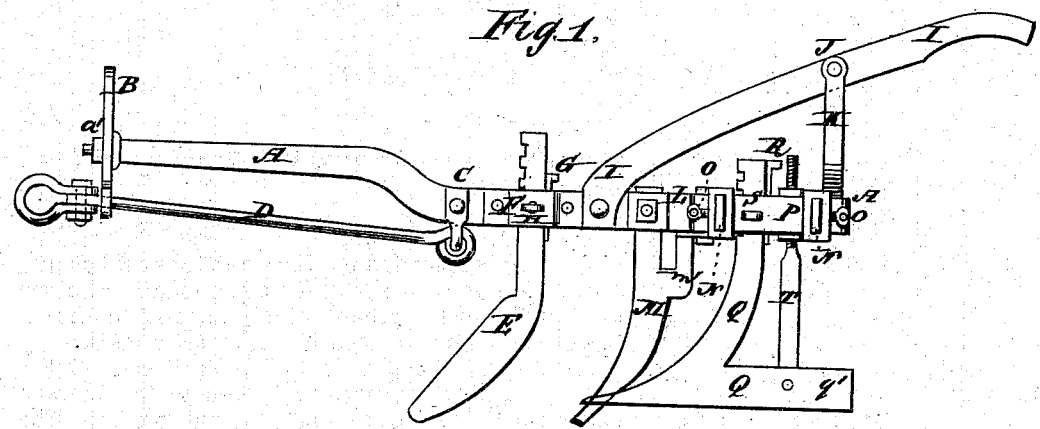
Figure 2:
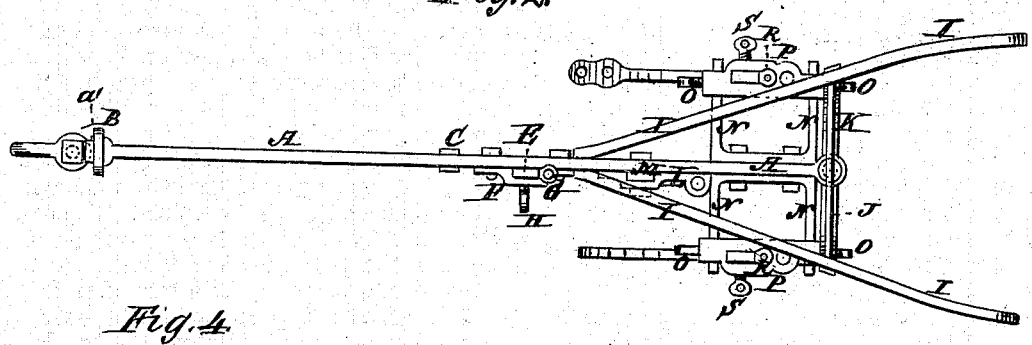
Figure 4:
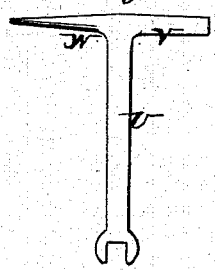
Figure 3:
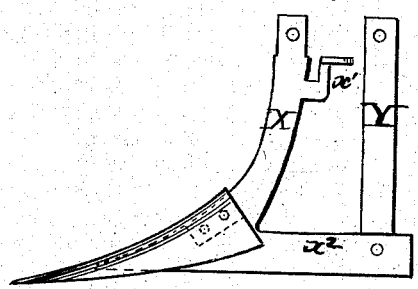

Be it known that I, ROBERT WEBER, of New Ulm, in the county of Austin and State of Texas, have invented a new and useful Improvement in Plow-Stock, of which the following is a specification:

Figure 1 is a side view of my improved plow-stock, showing different kinds of plow-standards attached to it. Fig. 2 is a top view of the same. Fig. 3 is a side view of another standard. Fig. 4 represents a tool for adjusting the various attachments of the stock.

Similar letters of reference indicate corresponding parts.

The object of this invention is to furnish an improved plow-stock, which shall be so constructed that various kinds of standards, according to the kind and size of the plows to be used, may be attached to it, which may be adjusted to take and leave land, as may be desired, and which shall be simple in construction and easily adjusted.

The invention will first be described in connection with the drawing, and then pointed out in claim.

A represents the plow-beam, upon the middle part of which is formed an upward offset, and, upon its forward end, is formed a shoulder, to receive the slotted bar B, and a screw-thread, to receive the nut $a'$, by which the said bar B is secured in place. To the beam A, just in the rear of its offset, is attached a loop or clevis, C, to receive an eye formed upon the rear end of the rod D, which passes forward beneath the beam A, and has a hook, eye, or clevis formed upon or attached to its forward end, to receive the draft.

By this construction, by loosening the nut $a'$, the point of draft attachment may be raised and lowered to cause the plow to work deeper or shallower in the ground, or turned to one or the other side, to cause the plow to take or leave land, and may be secured in place when adjusted by again tightening the nut $a'$.

E is a colter, the shank of which passes up through a keeper, F, bolted to the side of the beam A in the rear of its offset. The shank of the colter E is secured in the keeper F by a wedge, G, driven into the said keeper along the rear edge of the said shank, and by a set-screw, H, passing through the said keeper, and resting against the side of the said shank, so that the said colter may be readily adjusted to enter the ground to any desired depth.

Additional security may be obtained by forming notches in the forward edge of the shank, to receive a projection in the forward end of the cavity of the said keeper. The keeper F may remain upon the beam A to strengthen it, when the colter E is not used.

To the beam A, in the rear of the keeper F, are bolted the forward ends of the handles I, which are connected by a round, J, and are supported by a U-bar, K, the center of which is bolted to the rear end of the beam A. To the beam A, in the rear of the forward ends of the handles I, is bolted a keeper, L, which has a square socket formed in its forward part, to receive the standard M, and a round hole in its rear part to receive a bolt formed upon or attached to a brace, $m'$, formed upon or attached to the upper part of the said standard M. The upper end of the standard M is secured in place by a bolt passing through it and through the keeper L and beam A. Any desired kind of a plow may be attached to the standard M. To the opposite sides of the rear part of the beam A are bolted two U-bars, N, upon the ends of the arms of which are placed keepers P, which are secured in place upon said arms by set-screws O, so that by loosening the said set-screws the said keepers may be moved toward or from the plow-beam, to adjust the plows wider apart or closer together, as may be required. In the forward part of the keepers P are formed square sockets, to receive the upper ends of the standards Q, which are secured in place in said sockets by wedges R and set-screws S, as hereinbefore described, with reference to the standard M. In the rear part of the keepers P are formed round holes, to receive the braces T, which are secured in place by nuts screwed upon their upper ends. The lower ends of the braces T extend down, and are bolted to the foot $q'$ of the standard Q.

In the standard X, (shown in Fig. 3,) which is designed for large plows, both the short brace $x^1$, the long brace Y, and the foot $x^2$, are used.

The U-bars N may both be attached to the rear part of the beam, as shown in Figs. 1 and 2, or they may both be attached to the middle part of the beam, where the keeper F is attached, or one may be attached to the rear part, and the other to the middle part of said beam, as the kind of plows to be used, and the kind of plowing to be done, may require.

When the standard shown in Fig. 3 is to be used, the main standard and the short brace are secured to the keeper L, and the long brace is secured by the forward bolt that secures the U-bars N to the rear end of the beam.

The tool represented in Fig. 4 is all that is required to effect the various adjustments of the plow-stock, and consists of a wrench, U, having a cross-head upon the end of the handle, one arm, V, of said cross-head being a hammer, and the other arm W being made pointed.

All the nuts are made of the same size, so as to be turned by the wrench U. All the set-screws have holes in their heads, so that they may be turned by the pointed arm W. The hammer V is used for driving the wedges in and out.

Having thus described my invention, I claim as new and desire to secure by Letters Patent—

1. The keeper L, provided with a square socket in its forward part, and a round socket in its rear part, in combination with the beam A, for securing a standard to said beam, substantially as herein shown and described.

2. The combination, with the beam A, of the U-bars N and keepers P, the latter provided with square forward and round rear sockets, as shown and described, so that standards may be fastened thereto by screws and wedges, in the manner specified.

ROBERT WEBER.

Witnesses:
C. C. ROCH,
W. LEHR.